July 15, 1941.   L. W. YOUNG   2,249,338
BLOWPIPE
Filed Dec. 31, 1937   2 Sheets-Sheet 1

INVENTOR
LLOYD W. YOUNG
BY
ATTORNEY

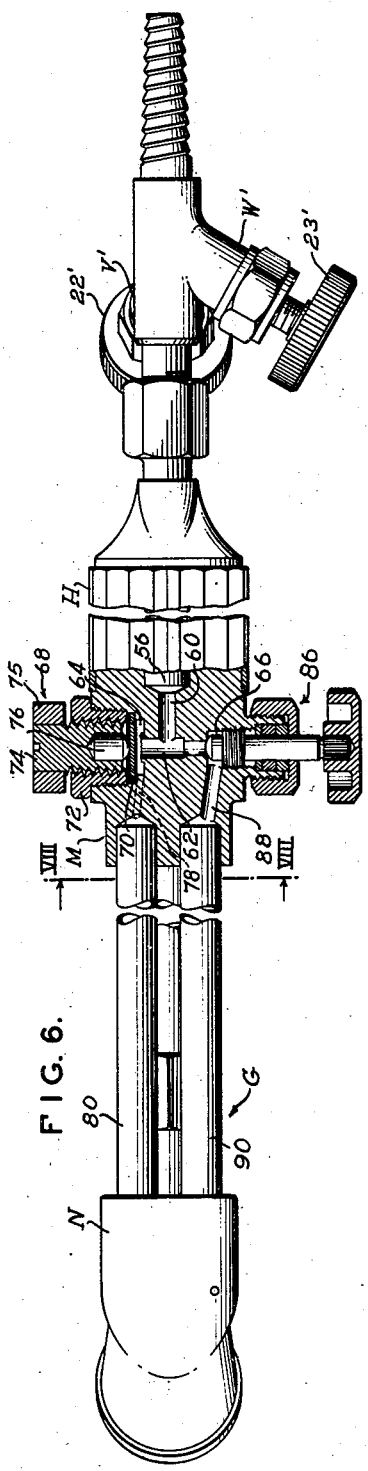
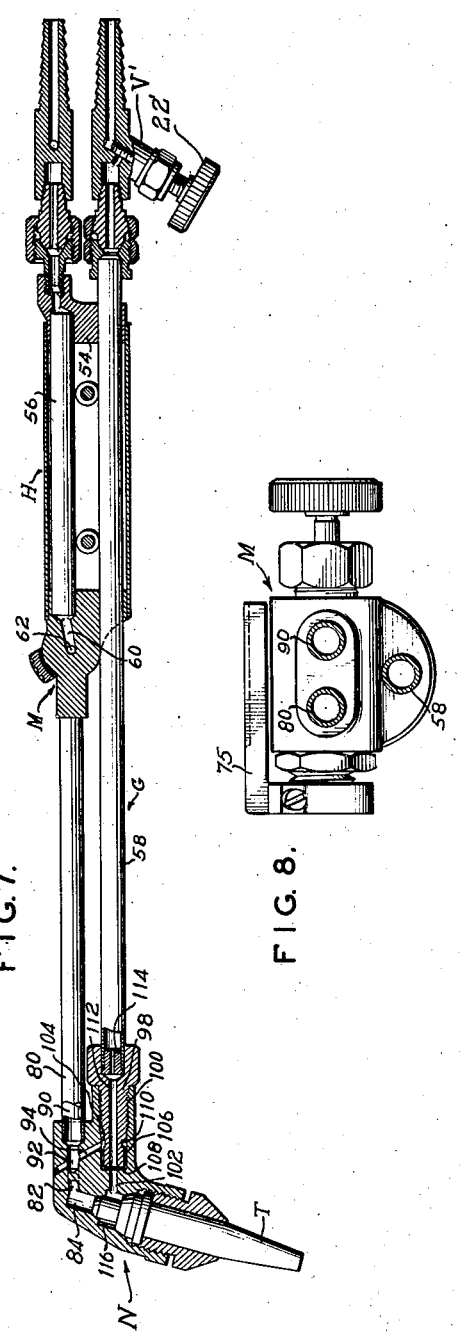

Patented July 15, 1941

2,249,338

UNITED STATES PATENT OFFICE 2,249,338

BLOWPIPE

Lloyd W. Young, Scotch Plains, N. J., assignor to Oxweld Acetylene Company, a corporation of West Virginia Application December 31, 1937, Serial No. 182,840

10 Claims. (Cl. 158—27.4)

This invention relates to blowpipes, and more particularly to welding or cutting blowpipes which possess operating characteristics of the highest standard and yet are extremely light in weight, simple in construction, and less expensive to manufacture and to maintain in efficient operating condition than known blowpipes of similar characteristics. The invention is especially useful in its application to medium pressure welding or cutting blowpipes, to which use, however, the invention is not limited. The invention also relates to novel mixing means for use with a blowpipe.

Prior known blowpipes possessing operating characteristics of the highest standards are comparatively expensive because they embody a complicated construction incapable of being readily disassembled. Consequently, when any of the parts of such blowpipes get out of order, such as the oxygen and acetylene inlet valves which require frequent repair, it is necessary to return the entire blowpipe to the manufacturer for repair or valve replacement. Furthermore, the position of the valve bodies in such blowpipes are fixed with respect to the remainder thereof, often being inconveniently disposed for the operator when doing certain types of work. When it is desired to substitute one such type of blowpipe for another, it is necessary to disconnect one from, and to connect another to the gas supply hoses, which requires the operator to leave the work and turn off the gas at the regulators. This procedure not only consumes the operator's time, but it also causes a loss of the gas within the hoses between the regulators and the blowpipe.

An object of the invention is to provide a light weight blowpipe of simple construction having a small number of parts, and possessing operating characteristics of the highest standards. Other objects are to provide a blowpipe comprising a novel mixer block; and to provide blowpipe mixer means of exceptionally high flashback resistance.

The above and other objects and novel features of the invention will be apparent from the following description taken with the accompanying drawings, in which:

Fig. 6 is a top plan view, partly in section, of a cutting blowpipe embodying the principles of this invention;

Fig. 7 is a sectional side elevational view of the blowpipe shown in Fig. 6; and Fig. 8 is a sectional view taken along line VIII—VIII of Fig. 6.

In accordance with the invention, there is provided a blowpipe comprising a mixer block having a plane forward end, a substantially axial gas passage therethrough, and an eccentric gas passage terminating in an annular groove in the forward end of the block surrounding the end of the central passage therein.

The blowpipe mixer means comprises, in combination, means provided with a gas mixture passage; an acetylene gas passage axially aligned with and of substantially the same diameter as the gas mixture passage for discharging acetylene gas into the gas mixture passage; plane faces slightly spaced apart to provide a radial space surrounding the axis of the passages; an annular groove concentric with the axis and opening at right angles to the radial space; an eccentric oxygen passage for delivering oxygen to the radial space through the annular groove; and means provided with a constriction for delivering acetylene gas to the acetylene gas passage, which constriction serves to suppress flashbacks and also to meter the acetylene gas flowing into the gas mixture passage; the arrangement being such that, by virtue of the small space between the faces, the oxygen is wiredrawn and this, together with the right angular relation of the space relative to the flow of acetylene, provides relatively high flashback resistance.

Figure 1:
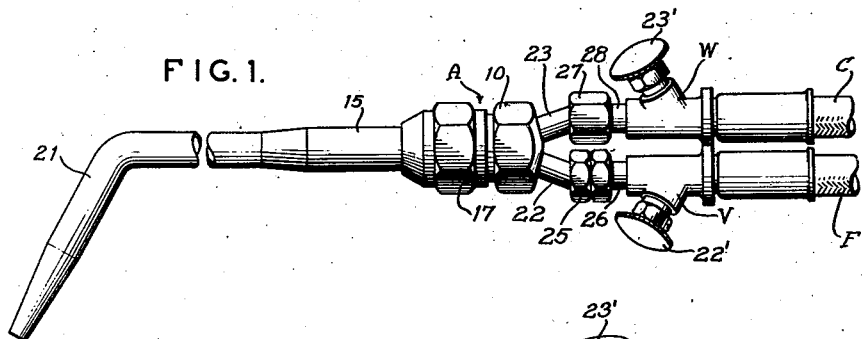
Fig. 1 is a broken side elevational view of a welding blowpipe embodying the principles of this invention.
Figure 2:
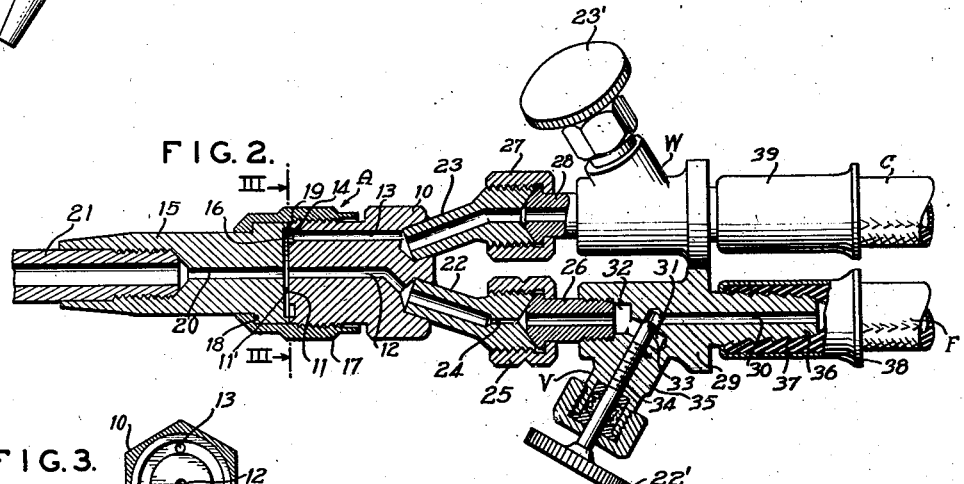
Fig. 2 is an enlarged elevational view, partly in section, of the blowpipe shown in Fig. 1.
Figure 3:
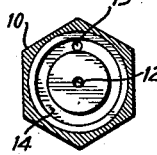
Fig. 3 is a cross-sectional view taken along the line III—III of Fig. 2.

The invention is shown in Figs. 1 to 3, as applied to a welding blowpipe A, provided with a hose F for supplying a fuel gas such as acetylene to the blowpipe; a hose C for supplying a combustion-supporting gas such as oxygen to the blowpipe; and separate valves V and W attached respectively to the forward ends of the hoses F and C and removably attached to the blowpipe A.

The blowpipe A includes a mixer block 10 provided with a plane or flat front end 11 forming one wall of a radial longitudinal passage 11'. The block 10 is provided with passages 12 and 13 extending therethrough for conducting a fuel gas and a combustion-supporting gas toward the radial passage 11'. The passage 13 terminates in an annular gas-distributing groove 14 in the flat front end 11 of the block 10. The rear end of the mixer block 10 is preferably formed as a nut in order to facilitate its assembly with other parts of the blowpipe.

A thick-walled adaptor 15 having a plane or flat rear end surface 16 within an annular lip 19 is gas-tightly connected to the forward part of the mixer 10 by a coupling nut 17. The assembly of the adaptor 15 and the block 10 is such that the flat rear end 16 of the former is spaced from, but disposed very close to the flat front end 11 of the mixer block 10 thus completing the radial passage 11'.

From the foregoing, it will be evident that a combustion-supporting gas passing forwardly through the passage 13 in the mixer block 10 will enter the annular gas-distributing groove 14, whence it will pass into the radial passage 11' between the forward end 11 of the mixer 10 and the rear end 16 of the thick-walled adaptor 15, whence it will flow radially inward from all sides to mix with a fuel gas passing forwardly through the passage 12 in the mixer block 10. By virtue of the small space between the faces 11 and 16, the combustion-supporting gas is wire-drawn. This together with the right angular relation of the radial passage 11' relative to the flow of the fuel gas, increases the flashback resistance of the blowpipe. Thus the two gases will be thoroughly mixed and the mixture will pass forwardly through a central passage 20 of the adaptor 15 to a stem 21 which is threadedly attached thereto. The diameter of the passage 20 in the adaptor 15 is preferably equal to that of the passage 12 in the mixer 10. Since the internal diameter of the stem 21 is considerably greater than that of the mixture passage 20, no pressure can be built up in the latter passage, and the result is a greatly increased velocity of gas passage through the mixture passage 20.

The adaptor 15 and the block 10 cooperate to form the mixing chamber of the blowpipe. Inasmuch as the welding head 21 forms no part of the mixing chamber, a wide range of such heads may be employed with one mixer to cover the entire welding range and the construction can be manufactured at a minimum cost.

The fuel gas and combustion-supporting gas valves V and W are operatively connected to the blowpipe A in a novel manner which will now be described. A fuel gas delivery nipple 22 is soldered or otherwise attached to the mixer block 10 at the rear end of the passage 12, and a combustion-supporting gas nipple 23 is soldered or otherwise attached to the block 10 at the rear end of the passage 13. The fuel gas delivery nipple is provided with a constriction 24 which additionally serves to suppress flashbacks and also to meter the supply of fuel gas to the blowpipe. The combustion-supporting gas nipple 23 is similar to the fuel gas delivery nipple 22 but lacks the constriction 24 of the fuel gas delivery nipple.

Readily detachable and adjustable union connections are made between the nipples 22 and 23 and the corresponding valves V and W. Thus, an internally threaded and internally shouldered hollow nut 25, threaded upon the rear end of the nipple 22, draws the forward spherical end of a nipple 26 gas-tightly against a conical seat at the rear end of the nipple 22. In the same manner, a hollow nut 27, similarly threaded and shouldered, draws the forward spherical end of a nipple 28 against a conical seat at the rear end of the nipple 23. The nipples 26 and 28 are threaded into, and preferably silver soldered to, the forward ends of the valve bodies V and W respectively. The connection disclosed permits independent adjustment of each of the nipples 26 and 28 about its axis with respect to the corresponding nipple 22 or 23, thus enabling the operator to set the valve bodies V and W, and particularly the valve operating wheels 22' and 23' thereof, independently of one another and into any convenient position desired by the operator.

The replaceable valves V and W are identical; only one need, therefore, be described. The valve V comprises a body 29 which is generally circular in cross-section. An axial passage 30 extends forwardly from the rear end of the valve body to a valve chamber 31, which, in turn, opens into an internally threaded axial cavity 32 in the forward end of the valve body 29. The nipple 26 is threaded into this cavity. A valve 33, which may be the end of a threaded valve stem 34, seats against the entrance of the passage 30 into the valve chamber 31, thereby permitting, preventing, or controlling the entrance of gas into the valve chamber. The valve stem 34 is threaded into a projection 35 on the body 29 out of which it extends, being packed against leakage in the usual way. The valve operating wheel 22' is fastened to the outer end of the valve stem 34 and provides means for turning the valve stem to seat or unseat the valve.

The rear end of the valve body 29 is formed as a tapering hose connection 36, and ridges 37 are formed externally thereof (for instance, spirally) to facilitate attachment of the hose F. In making the connection, the tapering end 36 is inserted into the end of the hose F; and a ferrule 38 holds the end of the hose squeezed tightly against the end 36.

The type of blowpipe which is illustrated in Figs. 1 to 3, inclusive, is compact and simple. The elongated ferrules 38 and 39, with the rear portions of the valve bodies V and W, are sufficiently close together to serve as the grip of the blowpipe, in which case the valve wheels 22' and 23' are in front of the hand holding the blowpipe. The short distance between the ends of the gas supply hoses and the point of grasping the blowpipe permits easy manipulation of the blowpipe because of the flexibility of the hose.

Figure 4:
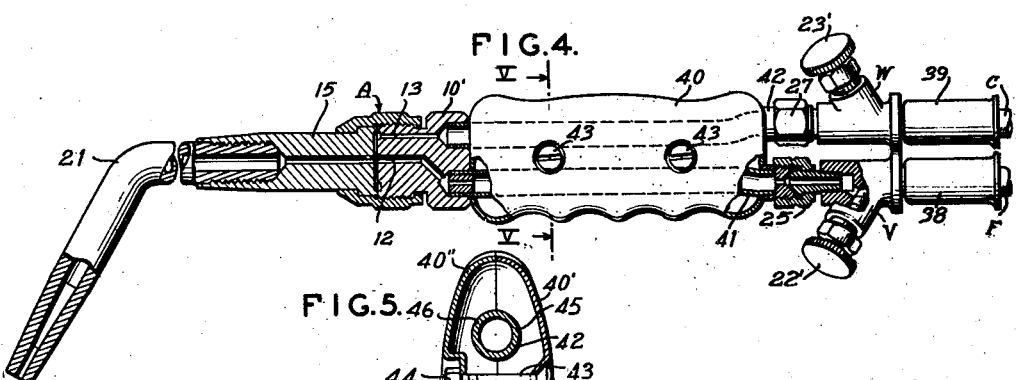
Fig. 4 is a broken side elevational view, partly in section, of a welding blowpipe embodying another form of the invention.
Figure 5:
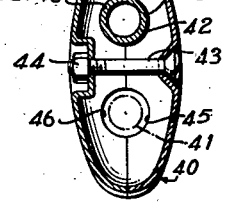
Fig. 5 is a cross-sectional view taken along the line V—V of Fig. 4.

In the embodiment which is illustrated in Figs. 4 and 5, a handle 40 having fuel gas and combustion-supporting gas conduits 41 and 42 extending therethrough is positioned between the mixer 10' and the valve bodies V and W. As shown, the handle 40 may consist of two complementary sections 40' and 40" of stamped or pressed metal, or of plastics or any other suitable material secured together by suitable means, such as bolts 43 and nuts 44. The ends of the handle sections are recessed to provide pairs of mating semi-circular openings 45 and 46 to receive the conduits 41 and 42. Contact between the edges of said openings and the conduits keeps the handle sections in proper relative position when the nuts 44 are tightened upon the bolts 43. The top surface of the handle 40 is curved to fit the palm of the hand; the lower surface is indented to accommodate the fingers and to provide a firm, comfortable grip. Otherwise, the construction shown in Figs. 4 and 5 is the same as that which has been described in connection with Figs. 1 to 3. This latter described arrangement permits use of the invention in cases where it is desired to employ such a blowpipe with a handle, and with the valve wheels 22' and 23' behind the hand that holds the blowpipe. It will be noted, however, that the hoses and valves may be turned or removed exactly as is the case when the construction illustrated in Figs. 1, 2, and 3 is employed.

Referring to Figs. 6 to 8 inclusive, the invention is shown as applied to a cutting blowpipe G comprising oxygen and acetylene inlets similar to those described in connection with Figs. 1 to 5; a handle H, the forward end of which supports an oxygen preheat and cutting-supply valve-body M; and a mixing head N attached to the valve-body M by two oxygen conveying tubes, and an acetylene conveying tube, the latter extending from the head N to the acetylene inlet at the rear of the blowpipe.

The handle H comprises two sections which when assembled form a hollow handle of polygonal cross-section. The handle H is provided at its rear end with a block 54 through which oxygen and acetylene conduits 56 and 58 extend. The valves V' and W' are connected to said conduits and to respective acetylene and oxygen hoses in a manner substantially identical with that of the connections between valves V and W, the nipples 22 and 23, and the hoses F and C of Fig. 2.

Valve-body M closes the forward end of the handle H, and the forward end of the oxygen conduit 56 terminates therein, while the acetylene conduit 58 passes therethrough, extending to, and terminating in the mixing head N. The body M is provided with a passage 60 opening into a lateral passage 62, one end of which opens into a valve chamber 64, and the other end of which opens into a valve chamber 66. A cutting-oxygen supply-valve 68 is mounted within chamber 64, and comprises a resilient diaphragm 70 seated on an annular lip of a threaded counter-bore of said chamber 64, and it is maintained thereon by a hollow nut 72. The internal bore of the hollow nut 72 is provided with threads of relatively large pitch, and a valve operating element 74 is threaded therein. The pitch of the last mentioned threads provides means for laterally moving the element 74 into and out of effective position when an oscillating movement is imparted to the element 74. An oscillatable operating handle 75 is connected to one end of element 74 and is adapted to extend over the top of body M in position to be oscillated by the hand of the operator in which the blowpipe is held. A valve seating element 76 is located in the other end of element 74 in contact with one surface of the diaphragm 70 so that laterally inward movement of element 74 forces diaphragm 70 into sealing engagement with the one end of passage 62.

Chamber 64 is connected to an exit passage 78 which leads to one end of an oxygen conduit 80. The other end of conduit 80 terminates in the mixing head N and is in communication with a passage 82 therein leading to the oxygen chamber 84. The chamber 84 opens into a central passage extending entirely through the tip T.

Flow of oxygen into chamber 66 within body M is adapted to be controlled by a preheat valve 86 of usual construction. Chamber 66 is connected to a passage 88 leading to and in communication with a preheat oxygen conduit 90.

The opposite end of conduit 90 is mounted in the head N, and is in communication with a chamber 92. Chamber 92 exits into a passage 94 for conveying the preheat oxygen to a mixing chamber hereinafter more fully described.

The acetylene conduit 58 is connected to the head N through a mixer 98 secured within a counterbored portion, forming a mixing chamber 100, of a bore 102. The mixer 98 comprises a cylindrical forward portion 104 adapted to be spaced from the walls of the chamber 100 by a slight clearance forming an annular passage 106 therewith. The end of portion 104 lies in a plane at right angles to the longitudinal axis of the mixer 98, and it is spaced slightly from the forward end of chamber 100 thereby forming a thin radial passage 108 leading from the annular passage 106 to the bore 102. The portion 104 is further provided with an annular distributing channel 110 into which passage 94 leads. Thus the preheat oxygen supply passes through chamber 66, passage 88, conduit 90, chamber 92, passage 94, channel 110, annular passage 106, radial passage 108 and bore 102, where it is mixed with the acetylene from conduit 58 which passes through an axial passage 112 within mixer 98.

A restriction 114 is provided at the connection between the conduit 58 and the mixer 98, and it together with the restriction provided by the thin radial and right angular annular passages 108 and 106 provide a construction that is highly resistant to flashbacks. The mixed gas passes through passage 102 into chamber 116 where it is evenly distributed between the preheat passages within the tip T.

Certain features disclosed herein are claimed in divisional applications Serial No. 366,230, filed November 19, 1940, and Serial No. 366,827, filed November 23, 1940.

The forms of the invention here described and illustrated in the accompanying drawings are disclosed merely to indicate how the invention may be applied. Other forms, differing in detail but not in principle from those here shown and described, will, of course, suggest themselves to those skilled in the art.

I claim:

1. A blowpipe comprising a mixer block having a plane forward end, a substantially axial gas passage therethrough, and an eccentric gas passage terminating in an annular groove in the forward end of said block surrounding the end of the central passage therein.

2. A blowpipe comprising, in combination, a mixer block having oxygen and acetylene passages therethrough, said block also having a plane forward end in which one of the passages terminates, said block further having an annular groove in its forward end in which the other passage terminates; a mixture conduit having a plane rear end; and means for connecting said mixture conduit gas-tightly to said mixer block with their plane ends spaced slightly apart.

3. A blowpipe comprising, in combination, an oxygen delivery nipple; an acetylene delivery nipple having a constriction in the passage therethrough; a mixer block having oxygen and acetylene passages therethrough, said block also having a plane forward end in which one of the passages terminates, said block further having an annular groove in its forward end in which the other passage terminates; a mixture conduit having a rearwardly extending annular lip at its rear end; the annular lip being spaced farther from the axis of said mixture conduit than is the annular groove from the axis of said block in order that the lip may surround the groove when said block and said conduit are brought together in end to end coaxial relationship; and attaching means for connecting said conduit gas-tightly to said block.

4. For use with a blowpipe, a mixer block having two gas passages therethrough, said block also having a plane forward end in which one of the gas passages terminates, said block further having an annular groove in its forward end in which the other gas passage terminates.

5. For use with a blowpipe, a mixer block having a plane forward end with an annular groove formed therein surrounding the major portion of its forward end, said block also having a gas passage therethrough terminating substantially centrally of its forward end and a second gas passage therethrough terminating in the annular groove in its forward end.

6. For use with a blowpipe, a mixer block having a plane forward end with an annular groove formed therein, two gas passages longitudinally extending through said block, one passage terminating substantially centrally of said forward end, the other passage terminating in said annular groove, a mixture conduit having a longitudinal passage therethrough and an external circumferential shoulder provided with a rearwardly extending peripheral rim cooperating with the forward end of said mixer block to maintain the rear end of said mixture conduit in spaced relation to the forward end of said mixer block when said conduit and said block are contiguous, and a sleeve provided with an internal flange adapted to engage said external shoulder, said sleeve establishing a sealed connection between said mixer block and said mixture conduit.

7. A mixer block as defined in claim 6 in which the rearwardly extending peripheral rim of the mixture conduit cooperates with that portion of the forward end of the mixer block which is external of the annular groove formed in said block.

8. A blowpipe comprising a body having one central and one eccentric longitudinal gas passage extending therethrough, and also having a plane forward end provided with a continuous groove in which said eccentric passage terminates, an adaptor having a longitudinal passage extending therethrough and provided with a shallow depression at its rear end, said rear end being adapted to be held in gas-tight circumferential abutment against the forward end of said body whereby a narrow chamber is formed between said ends to provide a mixing chamber for gases discharged into said chamber from said central passage and from said eccentric passage through said groove.

9. Blowpipe mixer means comprising, in combination, means provided with a gas mixture passage; an acetylene gas passage axially aligned with and of substantially the same diameter as said gas mixture passage for discharging acetylene gas into said gas mixture passage; plane faces slightly spaced apart to provide a radial space surrounding the axis of said passages; an annular groove concentric with said axis and opening at right angles to said radial space; an eccentric oxygen passage for delivering oxygen to said radial space through said annular groove; and means provided with a constriction for delivering acetylene gas to said acetylene gas passage, which constriction serves to suppress flashbacks and also to meter the acetylene gas flowing into said gas mixture passage; the arrangement being such that, by virtue of said small space between said faces, the oxygen is wire-drawn and this, together with the right angular relation of said space relative to the flow of acetylene, provides relatively high flashback resistance.

10. Blowpipe mixer means comprising, in combination, a member having an axial gas mixture passage; another member having an axial gas delivery passage aligned with and of substantially the same size as said gas mixture passage; said members having plane faces slightly spaced apart to provide a radial space surrounding the axis of said passages; an annular groove, in one of said members, concentric with said axis and opening at right angles to said radial space; an eccentric gas delivery passage, in one of said members, connected to said groove; one gas supply passage means provided with a constriction connected to one of said gas delivery passages; and another gas supply passage means connected to the other one of said gas delivery passages; the arrangement being such that, by virtue of the small space between said faces, one gas is wire drawn and this, together with the right angular relation of said space relative to the flow of the other gas, provides relatively high flashback resistance.

LLOYD W. YOUNG.